United States Patent [19]
Karim et al.

[11] Patent Number: 5,721,289
[45] Date of Patent: Feb. 24, 1998

[54] STABLE, LOW CURE-TEMPERATURE SEMI-STRUCTURAL PRESSURE SENSITIVE ADHESIVE

[75] Inventors: Naimul Karim, Maplewood; Kevin E. Kinzer, Woodbury; Albert I. Everaerts, Oakdale; Leo W. Halm, Blaine; Steven J. Keipert, Oakdale; Jerry W. Williams, Cottage Grove, all of Minn.

[73] Assignee: Minnesota Mining and Manufacturing Company, St. Paul, Minn.

[21] Appl. No.: 531,275

[22] Filed: Oct. 5, 1995

Related U.S. Application Data

[63] Continuation-in-part of Ser. No. 445,143, May 19, 1995, abandoned, which is a continuation of Ser. No. 334,692, Nov. 4, 1994, abandoned.

[51] Int. Cl.$^6$ .................. C08F 2/50; C08F 4/80; C09J 133/08; C09J 133/10
[52] U.S. Cl. .................. 522/31; 522/66; 522/113; 522/129; 522/130; 522/25; 522/28; 522/29
[58] Field of Search ............... 522/31, 66, 113, 522/129, 130, 25, 28, 29

[56] References Cited

U.S. PATENT DOCUMENTS

| | | | |
|---|---|---|---|
| 3,723,392 | 3/1973 | Konig et al. | 260/75 NP |
| 4,156,035 | 5/1979 | Tsao et al. | 427/44 |
| 4,223,067 | 9/1980 | Levens | 428/308 |
| 4,227,978 | 10/1980 | Barton | 204/159.12 |
| 4,286,047 | 8/1981 | Bennett et al. | 430/280 |
| 4,428,807 | 1/1984 | Lee et al. | 204/159.14 |
| 4,606,962 | 8/1986 | Reylek et al. | 428/148 |
| 4,619,979 | 10/1986 | Kotnour et al. | 526/88 |
| 4,657,779 | 4/1987 | Gaske | 427/54.1 |
| 4,694,029 | 9/1987 | Land | 522/8 |
| 4,707,432 | 11/1987 | Gatechair et al. | 430/281 |
| 4,717,605 | 1/1988 | Urban et al. | 428/1 |
| 4,846,905 | 7/1989 | Tarbutton et al. | 525/65 |
| 4,849,320 | 7/1989 | Irbing et al. | 430/280 |
| 4,950,696 | 8/1990 | Palazzotto et al. | 522/25 |
| 4,985,340 | 1/1991 | Palazzotto et al. | 430/270 |
| 5,059,701 | 10/1991 | Keipert | 556/13 |
| 5,086,088 | 2/1992 | Kitano et al. | 522/170 |
| 5,252,694 | 10/1993 | Willett et al. | 525/404 |
| 5,262,232 | 11/1993 | Wilfong et al. | 428/327 |

FOREIGN PATENT DOCUMENTS

| | | | |
|---|---|---|---|
| 0 109 851 A2 | 5/1984 | European Pat. Off. | C08F 4/72 |
| 0 476 822 A2 | 3/1992 | European Pat. Off. | C09J 175/04 |
| 5-78639 | 3/1993 | Japan | C09J 163/00 |
| WO 84/03837 | 10/1984 | WIPO | A61L 15/06 |
| WO 91/16387 | 10/1991 | WIPO | C09J 133/00 |

OTHER PUBLICATIONS

Frisch & Reegan, Ring–Opening Polymerizations, vol. 2 (1969).
Lee & Neville, Handbook of Epoxy Resins (1967).
P. Bruins, Epoxy Resin Technology (1968).
Bull. Am. Phys. Soc., J, 5123 (1956).
Saunders, High Polymers, "Polyurethanes, Chemistry and Technology", vol. 1, pp. 32–43, 45–55 (1962).
Saunders, High Polymers, "Polyurethanes, Chemistry and Technology", vol. II, pp. 4–7, 198–199 (1964).
Kuntststoff–Handbuch, Polyurethane, Band VII, pp. 45–71 (1966).
Murov, Handbook of Photochemistry, Marcel Dekker, Inc. NY 27–35 (1973).
Rauwendaal, ed. Polymer Extrusion, Hanser Publ. pp. 322–330 (1986).

*Primary Examiner*—Susan W. Berman
*Attorney, Agent, or Firm*—Carolyn V. Peters

[57] ABSTRACT

A curable pressure sensitive adhesive having long shelf stability comprising (a) at least one free radically polymerized polymer; (2) at least one cationically-polymerizable monomer; (3) a photo-activatable catalyst system for the cationically-polymerizable monomer comprising either at least one organometallic complex salt or at least one onium salt; and (4) optionally, a monohydric or polyhydric alcohol, wherein there is essentially no conversion of the cationically-polymerizable monomer of the curable pressure sensitive adhesive when stored in a manner to exclude actinic radiation, and methods of making the same.

9 Claims, No Drawings

STABLE, LOW CURE-TEMPERATURE SEMI-STRUCTURAL PRESSURE SENSITIVE ADHESIVE

CROSS RELATED APPLICATIONS

This is a continuation-in-part of U.S. Ser. No. 08/445,143, filed May 19, 1995, now abandoned, which is a continuation of U.S. Ser. No. 08/334,692, filed Nov. 4, 1994, now abandoned.

BACKGROUND OF THE INVENTION

1. Field of the Invention

This invention relates to curable pressure-sensitive adhesives comprising (meth)acrylic polymers and epoxy prepolymers, wherein the pressure-sensitive adhesives have extended shelf lives and exhibit excellent bond strengths when cured and the cured pressure sensitive adhesives are particularly useful as structural or semi-structural adhesives.

2. Description of the Related Art

Elimination of solvents from polymeric articles and coatings and from the processes by which they are produced is the subject of intense, ongoing efforts throughout the world. These efforts have included the development of high- and 100%-solids formulations polymerized by thermal, photo and energy-ray means to produce a wide variety of polymeric products. Such formulations include polymers prepared from acrylic, urethane, and epoxy precursors, and mixtures thereof. However, many of these processes have significant drawbacks, either related to processing or related to performance characteristics of the polymeric products.

A number of polymerizable systems comprising mixtures of acrylate monomers and urethane precursors or acrylate monomers and epoxy monomers have been described in the art. See, for example, U.S. Pat. Nos. 5,086,088 and 5,262,232, EPA 476,822 and WO 91/16387. The processes for these systems have a number of disadvantages. For example, acrylate monomers by themselves are generally polymerized in solution. While solution polymerization is useful to control the characteristic polymerization exotherm of the acrylate monomers, there remains the necessity of disposing of organic solvents used in such a process. Alternatively, acrylate monomers can be polymerized in bulk with photo or e-beam radiation processes, which typically require an inert atmosphere.

However, once mixed acrylate-epoxy polymerizable mixtures are exposed to radiation, that is, the radiation necessary to initiate polymerization of the acrylate component, the epoxy component is invariably compromised. The epoxy component can begin to cure, albeit slowly, even though the epoxy initiators have not been fully initiated. Such a gradual curing process reduces the shelf life of the epoxy component. This is generally not a serious limitation unless there is a desire to maintain a distinct period of time between the cure of the acrylate component and the epoxy component.

Many dual-cure systems have been described. For example, there are systems having multiple components, each with the appropriate catalysts that are cured at essentially the same wavelength. Additionally, there are systems that are multiple component, again with the appropriate catalysts that are cured at different wavelengths. Many of these systems have been described in the art, for example, see U.S. Pat. Nos. 5,252,694, 5,262,232, 4,156,035, 4,227,978, 4,428,807, 4,717,605, 4,657,779, 4,694,029, 4,707,432, 4,950,696, 4,985,340, and 4,849,320.

In many cases, photoinitiation of acrylate and epoxy monomers is carried out using different wavelengths of radiation, in order to separate, in time, the cure of the two systems. Typically, such dual-cure methods are only moderately successful in separating the two cures (i.e., irradiating wavelengths overlap) so that the systems have limited shelf life following the initial irradiation step.

A dual-component system in which the acrylate polymer is prepared in a solvent that is subsequently stripped, followed by admixture with an epoxide precursor that can be polymerized under UV light irradiation is an alternative method of preparing dual component compositions. However, this process produces a "release on demand" adhesive that is readily detackified by exposure to actinic radiation. See, for example, U.S. Pat. No. 4,286,047.

Reactive extrusion is another method for thermally polymerizing acrylic monomers in bulk using a wiped-film extruder. See, for example, U.S. Pat. No. 4,619,979. However, this method is inapplicable for acrylate monomers that cross-link or form gels during polymerization. As a result, acrylic polymers made by this method tend to show limited utility as high-strength adhesives. Addition of cationically-polymerizable monomers (e.g., epoxies) during or after acrylate polymerization, and polymerization thereof, to prepare dual-component adhesives has not been dealt with.

What is not disclosed in the art is a composition exhibiting the desirable properties of both a conventional pressure-sensitive adhesive (e.g., a polyacrylate) and a thermosetting resin (e.g., an epoxy resin), having a significantly longer shelf life after the PSA portion has been fully cured than such compositions as are currently known.

SUMMARY OF THE DISCLOSURE

The present invention describes a curable pressure sensitive adhesive that upon curing provides a semi-structural or structural adhesive, wherein the pressure sensitive adhesive comprises:

(1) at least one polymer obtained from polymerization of at least one free-radically polymerizable monomer;

(2) at least one cationically-polymerizable monomer;

(3) a photo-activatable catalyst system for the cationically-polymerizable monomer comprising either at least one organometallic complex salt or at least one onium salt; and (4) optionally, a monohydric or polyhydric alcohol, wherein there is essentially no conversion of the cationically-polymerizable monomer of the curable pressure sensitive adhesive for at least 10 days, at 20° C., ~50% RH, when stored in a manner to exclude actinic radiation which is capable of activating the catalyst system.

In a second aspect of the invention, a method of preparing a curable pressure sensitive adhesive is provided, comprising the steps of:

(1) preparing a polymerizable composition comprising a mixture of (a) at least one free-radically polymerizable monomer, (b) at least one thermal free-radical initiator, (c) at least one cationically-polymerizable monomer, (d) a photo-activatable catalyst system for the cationically-polymerizable monomer comprising at least one organometallic complex salt or at least one onium salt, and (e) optionally, a monohydric or polyhydric alcohol; and (2) applying sufficient thermal energy to the mixture to effect essentially complete polymerization of the thermally free-radically polymerizable monomer.

While any thermally-initiated free radical polymerization process is useful in the practice of step 2 of the present invention, reactive extrusion and thermal polymerization in the presence of a heat transfer medium are particularly useful processes. Advantageously, the photo-activatable cationic catalyst is not affected under the operating parameters of thermal energy application. This provides a stable pressure sensitive adhesive that upon application to a substrate can be subsequently irradiated in situ to provide a semi-structural or structural adhesive.

In the present invention, a controlled thermal polymerization process for the production of adhesives and adhesive-coated tapes with acceptable product properties can be achieved by using a thermal polymerization step conducted in conjunction with a thermal buffer comprising a heat transfer process that features a relatively high heat transfer coefficient, such as forced convection using flowing water. Preferably, the adhesives are acrylic-based, which exhibit particularly troublesome, and at times, process rate limiting polymerization exotherms.

Accordingly, the inventive process for the production of adhesives comprises allowing a carrier web coated with a free-radically polymerizable composition to remain in a thermal buffer for a time sufficient to effect conversion of the coating to an adhesive while controlling the reaction exotherm to maintain a reaction temperature within 20° C. of the temperature of the thermal buffer. The thermal buffer is characterized as a system for heat transfer wherein the heat transfer coefficient is at least 25 W/(m$^2$·K). Depending on the particular polymerizable mixture, it may be advantageous to exclude oxygen from the polymerization zone.

The coating on the carrier web can be a substantially solvent-free thermally polymerizable mixture, wherein the polymerizable mixture comprises at least one free-radically polymerizable monomer, at least one thermal initiator and optionally at least one cross-linker, at least one cationically polymerizable monomer and photo-activatable cationic catalyst system. Preferably, the free-radically polymerizable monomers are predominantly acrylic-based monomers.

In another embodiment of the present invention, a polymerizable composition is coated between a first and second carrier web to form a sandwich, and then processed as above. Advantageously, there is no need to eliminate oxygen from the polymerization zone.

A particularly useful feature of this invention is an adhesive system that has the combined properties of a pressure sensitive adhesive (for easy application) and a thermosetting resin (for a strong, permanent semi-structural or structural bond). Further, the adhesive system of the present invention exhibits a significantly longer shelf life after the pressure sensitive portion (the free radically polymerizable monomers) has been fully cured than similar compositions that are currently known in the art. Another advantage of the present invention, is the adhesive systems are prepared as 100% reactive coating compositions, substantially eliminating industrial solvent waste, while also reducing energy consumption.

The inventive method provides a significant advantage over the art in that initial polymerization of the free-radically polymerizable monomer(s) is accomplished in a manner that does not affect polymerization of the cationically-polymerizable monomer(s), nor does it activate the cationic polymerization catalyst (i.e., the organometallic complex salt or onium salt), which is thermally stable and photochemically labile. This ability to separate the two cures allows the adhesive systems of the invention to have very long shelf lives in the PSA state before application and use.

The pressure sensitive adhesive can be converted into a structural or semi-structural adhesive by: (a) applying sufficient irradiation to the curable PSA to activate the photo-activatable catalyst system, and (b) providing sufficient time and/or thermal energy to effect essentially complete polymerization of the cationically polymerizable monomer.

An additional advantage of the present invention is provided by the lower thermal curing temperatures of the cationically cured polymerizable monomer(s) as opposed to the thermal cure temperatures required for cationically-cured monomer(s) of known systems. Typically, temperatures required to cure cationically-cured monomers such as epoxies can be so high as to preclude the use of certain low-melting or temperature-sensitive backings or substrates. In contrast, photo-activatable catalyst systems used in the present invention are such that cationic cure to form structural or semi-structural adhesives can occur at lower, unharmful temperatures.

Further, the preferred present method of controlling the acrylate polymerization exotherm in a heat exchange medium allows complete temperature control over the pressure sensitive adhesive preparation step. Subsequent photo-activation and curing of the thermosetting resin component, that is, the epoxy component of the adhesive system increases bond strength to semi-structural level, which cannot be achieved by traditional pressure sensitive adhesives.

Yet another advantage of the invention is achieved due to the ability to control room-temperature latency of the photopolymerization catalyst used in curing the thermosetting resin. Thus, reasonable working times after photolysis of the composition can be realized (on the order of tens of minutes), allowing for positioning (and repositioning) of the substrates to be adhered before a permanent bond is obtained. The low cure temperature of the thermosetting resin makes the adhesive of the present invention especially suitable for those applications where higher temperatures cannot be tolerated, due to equipment limitations or to the use of thermally sensitive substrates (e.g., thermoplastics).

In yet a further aspect of the present invention, curable pressure sensitive adhesives can be prepared according to the method comprising the steps:

(1) preparing a first polymerizable composition comprising a mixture of (a) at least one free-radically polymerizable monomer, (b) at least one free-radical initiator, (2) applying sufficient energy to the mixture to effect essentially complete polymerization of the free-radically polymerizable monomer;

(3) mixing into the polymerized composition, a second polymerizable composition comprising a mixture of:

(a) at least one cationically-polymerizable monomer, (b) a photo-activatable catalyst system for the cationically-polymerizable monomer comprising at least one organometallic complex salt or at least one onium salt, and (c) optionally, a monohydric or polyhydric alcohol.

Alternatively, the cationically-polymerizable monomer can be added to the first polymerizable composition, wherein the photo-activatable catalyst system for the cationically-polymerizable monomer is added after the first polymerizable composition has been polymerized.

The free-radically polymerized polymer may be prepared in any of a number means known in the art, such as photo-polymerization or thermal-polymerization, either of which can be carried out in the bulk (100% solids) or in solution. If carried out in solution the solvent must be removed prior to melt blending. Preferably the free-radically polymerized polymer is prepared by photo-polymerization in the bulk with the cationically-polymerizable monomer present.

Advantageously, in contrast to known energy-curable epoxy-acrylate compositions, such as those described in U.S. Pat. No. 5,252,694 (col. 7, line 57 thru col. 8, line 56), thermally decomposable esters are not required as accelerators/additives in the present formulations.

As used in this application:

"acrylate syrup" means a composition comprising a partially polymerized mixture of (meth)acrylates only or a partially polymerized mixture of (meth)acrylates and unpolymerized epoxy monomers;

"(meth)acrylate-containing" means materials that are essentially free of (meth)acrylic acid, but contain a (meth) acrylate monomer, a mixture of (meth)acrylate monomers, or a (meth)acrylate-epoxy mixture, further the terms "(meth) acrylate" and "(meth)acrylic" include both acrylate and methacrylate and acrylic and methacrylic, respectively;

"thermal buffer" means a system that brings a material in contact with the buffer, such as the coated web, toward the temperature of the buffer and tends to maintain the material within the buffer at a relatively constant temperature;

"heat transfer coefficient of the thermal buffer" means the effective heat transfer coefficient for the process of heat transfer that occurs within the buffer from the coated carrier web to the thermal buffer. This heat transfer coefficient can be either a convective heat transfer coefficient, for example when a water bath is used for the thermal buffer, or a conductive heat transfer coefficient, for example when a heated metal surface is used for the thermal buffer.

"bireactive monomer" means a monomer that contains at least two free radically polymerizable groups or two cationically polymerizable groups and does not contain both types of groups;

"bifunctional monomer" means a monomer that contains at least one free radically polymerizable group and at least one cationically polymerizable group;

"group" or "monomer" or "anion" or "ligand" means chemical species that allows for substitution or that may be substituted by conventional substituents that do not interfere with the desired product, for example, substituents can be alkyl, alkoxy, aryl, phenyl, halo (F, Cl, Br, 1), cyano, nitro, etc.;

DESCRIPTION OF THE PREFERRED EMBODIMENT(S)

Cationically-polymerizable monomers useful in the invention include but are not limited to epoxy-containing materials, alkyl vinyl ethers, cyclic ethers, styrene, divinyl benzene, vinyl toluene, N-vinyl compounds, cyanate esters, 1-alkenes (alpha olefins), lactams and cyclic acetals.

Cyclic ethers that can be polymerized in accordance with this invention include those described in Frisch and Reegan *Ring-Opening Polymerizations* Vol. 2 (1969). Suitable 1,2-cyclic ethers include monomeric and polymeric types of epoxides. Particularly suitable are the aliphatic, cycloaliphatic, and glycidyl ether type 1,2 epoxides. A wide variety of commercial epoxy resins are available and listed in Lee and Neville *Handbook of Epoxy Resins* I1967) and P. Bruins *Epoxy Resin Technology* (1968). Representative of 1,3- and 1,4-cyclic ethers that can be polymerized in accordance with this invention are oxetane, 3,3-bis(chloromethyl) oxetane, and tetrahydrofuran.

Additional cationically-polymerizable monomers are described in U.S. Pat. No. 5,252,694 at col. 4, line 30 thru col. 5, line 34, the description of which is incorporated herein by reference. Preferred monomers of this class include EPON™828, and EPON™1001F and the ERL series of cycloaliphatic epoxy monomers such as ERL-4221™ or ERL-4206™; most preferred monomers are the ERL series because of their lower cure temperatures.

Free-radically polymerizable ethylenically-unsaturated monomers useful in the invention include but are not limited to (meth)acrylates and vinyl ester functionalized materials. Of particular use are (meth)acrylates. The starting material can either be monomers or oligomers such be described in U.S. Pat. No. 5,252,694 at col. 5, lines 35–68.

Alternatively, useful monomers comprises at least one free-radically polymerizable functionality. Examples of such monomers include specifically, but not exclusively, the following classes:

Class A—acrylic acid esters of an alkyl alcohol (preferably a non-tertiary alcohol), the alcohol containing from 1 to 14 (preferably from 4 to 14) carbon atoms and include, for example, methyl acrylate, ethyl acrylate, n-butyl acrylate, t-butyl acrylate, hexyl acrylate, isooctyl acrylate, 2-ethylhexyl acrylate, isononyl acrylate, isobornyl acrylate, phenoxyethyl acrylate, decyl acrylate, and dodecyl acrylate;

Class B—methacrylic acid esters of an alkyl alcohol (preferably a non-tertiary alcohol), the alcohol containing from 1 to 14 (preferably from 4 to 14) carbon atoms and include, for example, methyl methacrylate, ethyl methacrylate, n-propyl methacrylate, n-butyl methacrylate, isobutyl methacrylate and t-butyl methacrylate;

Class C—(meth)acrylic acid monoesters of polyhydroxy alkyl alcohols such as 1,2-ethanediol, 1,2-propanediol, 1,3-propane diol, the various butyl diols, the various hexanediols, glycerol, such that the resulting esters are referred to as hydroxyalkyl (meth)acrylates;

Class D—multifunctional (meth)acrylate esters, such as 1,4-butanediol diacrylate, 1,6-hexanediol diacrylate, glycerol diacrylate, glycerol triacrylate, and neopentyl glycol diacrylate although these monomers are generally not preferred for reactive extrusion or melt blending;

Class E—macromeric (meth)acrylates, such as (meth) acrylate-terminated styrene oligomers and (meth)acrylate-terminated polyethers, such as are described in PCT Patent Application WO 84/03837 and European Patent Application EP 140941;

Class F—(meth)acrylic acids and their salts with alkali metals, including, for example, lithium, sodium, and potassium, and their salts with alkaline earth metals, including, for example, magnesium, calcium, strontium, and barium.

Although cure temperatures of the cationically polymerizable monomers can be affected, it is within the scope of the present invention to also use a seventh class of free radically monomers, namely "Class G" monomers. Class G monomers include nitrogen-bearing monomers selected from the group consisting of (meth)acrylonitrile, (meth)acrylamide, N-substituted (meth)acrylamides, N,N-disubstituted (meth) acrylamides, the latter of which may include substituents of 5-and 6-membered heterocyclic rings comprising one or more heteroatoms, and methyl-substituted maleonitrile, and N-vinyl lactams, such as N-vinyl pyrrolidinone and N-vinyl caprolactam.

Two other criteria for the free-radical monomers are preferred, but not required: (a) these monomers should be miscible with the epoxy monomer(s) and (b) the free-radical monomers are preferably chosen such that their copolymers have composite Tgs in the range of 30° C. or less, as calculated by, e.g., the Fox equation, *Bull. Am. Phys. Soc.,* 1, 123 (1956).

Bifunctional monomers may also be used and examples that are useful in this invention possess at least one free radical and one cationically reactive functionality per monomer. Examples of such monomers include, but are not limited to glycidyl (meth)acrylate, hydroxyethyl (meth) acrylate, hydroxypropyl methacrylate and hydroxybutyl acrylate.

Suitable organometallic complex salts include those described in U.S. Pat. No. 5,059,701 and such description is incorporated herein by reference. In addition to those described in U.S. Pat. No. 5,059,701, the organometallic complex salts described in EPO No. 109,851 are also useful in the present invention. Useful organometallic complex salts used in the present invention have the following formula:

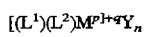

wherein $M^p$ represents a metal selected from the group consisting of: Cr, Mo, W, Mn, Re, Fe, and Co;

$L^1$ represents 1 or 2 ligands contributing pi-electrons that can be the same or different ligand selected from the group of: substituted and unsubstituted eta$^3$-allyl, eta$^5$-cyclopentadienyl, and eta$^7$-cycloheptatrienyl, and eta$^6$-aromatic compounds selected from eta$^6$-benzene and substituted eta$^6$-benzene compounds and compounds having 2 to 4 fused rings, each capable of contributing 3 to 8 pi-electrons to the valence shell of $M^p$;

$L^2$ represents none, or 1 to 3 ligands contributing an even number of sigma-electrons that can be the same or different ligand selected from the group of: carbon monoxide, nitrosonium, triphenyl phosphine, triphenyl stibine and derivatives of phosphorus, arsenic and antimony, with the proviso that the total electronic charge contributed to $M^p$ results in a net residual positive charge of q to the complex;

q is an integer having a value of 1 or 2, the residual charge of the complex cation;

Y is a halogen-containing complex anion selected from $BF_4^-$, $AsF_6^-$, $PF_6^-$, $SbF_5OH^-$, $SbF_6^-$, and $CF_3SO_3^-$; and n is an integer having a value of 1 or 2, the number of complex anions required to neutralize the charge q on the complex cation.

Preferred organometallic initiators are the cyclopentadienyl iron arenes (CpFeArenes), and preferably, $SbF_6^-$ is the counterion. CpFe(arenes) are preferred because they are very thermally stable yet are excellent photoinitiation catalysts.

Useful cationic photoinitiators comprising onium salts have been described as having the structure AX wherein:

A is an organic cation selected from diazonium, iodonium, and sulfonium cations, more preferably A is selected from diphenyliodonium, triphenylsulfonium and phenylthiophenyl diphenylsulfonium; and X is an anion, the counterion of the onium salts including those in which X is organic sulfonate, or halogenated metal or metalloid.

Particularly useful onium salts include, but are not limited to, aryl diazonium salts, diaryl iodonium salts, and triaryl sulfonium salts. Additional examples of the onium salts are described in U.S. Pat. No. 5,086,086, col. 4, lines 29-61, and such description is incorporated herein by reference.

Cationic photoinitiators that are also useful include aromatic iodonium complex salts and aromatic sulfonium complex salts. The aromatic iodonium complex salts have the formula:

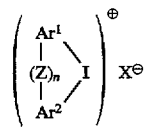

wherein $Ar^1$ and $Ar^2$ are aromatic groups having 4 to 20 carbon atoms and are selected from the group consisting of phenyl, thienyl, furanyl and pyrasolyl groups;

Z is selected from the group consisting of oxygen, sulfur,

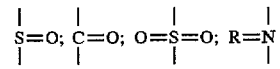

where R is aryl (having 6 to 20 carbon atoms, such as phenyl) or acyl (having 2 to 20 carbon atoms, such acetyl, benzoyl, etc.), a carbon-to-carbon bond, or

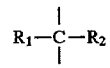

where $R_1$ and $R_2$ are independently selected from hydrogen, alkyl radicals of 1 to 4 carbon atoms, and alkenyl radicals of 2 to 4 carbon atoms;

n is zero or 1; and $X^-$ is a halogen-containing complex anion selected from tetrafluoroborate, hexafluorophosphate, hexafluoroarsenate, and hexafluoroantinomate.

Aromatic sulfonium complex salt photoinitiators are described by the formula:

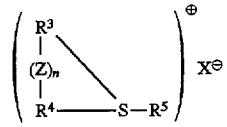

wherein $R_3$, $R_4$ and $R_5$ can be the same or different, provided that at least one of such groups is aromatic and such groups can be selected from the aromatic groups having 4 to 20 carbon atoms (for example, subsituted and unsubstituted phenyl, thienyl, furanyl) and alkyl radicals having 1 to 20 carbon atoms. The term "alkyl" as used here is meant to include substituted and unsubstituted alkyl radicals. Preferably, $R_3$, $R_4$, and $R_5$ are each aromatic groups; and Z, n and $X^-$ are as defined above.

Of the aromatic sulfonium complex salts that are suitable for use in the present invention, the preferred salts are triaryl-substituted salts such as triphenylsulfonium hexafluorophosphate and triphenylsulfonium hexafluoroantinomate. The triaryl substituted salts are preferred because they are more thermally stable than the mono- and diaryl substituted salts.

Thermal free radical initiators useful in the present invention include, but are not limited to azo, peroxide, persulfate, and redox initiators.

Suitable azo initiators include, but are not limited to 2,2'-azobis(4-methoxy-2,4-dimethlvaleronitrile) (VAZO™ 33), .2,2'-azobis(amidinopropane) dihydrochloride (VAZO™ 50); 2,2'-azobis(2,4-dimethylvaleronitrile) (VAZO™ 52); 2,2'-azobis(isobutrynitrile) (VAZ)™ 64);

2,2'-azobis-2-methylbutyronitrile (VAZO™ 67); 1,1'-azobis (1-cyclohexadecanecarbonitrile) (VAZO™ 88), all of which are available from DuPont Chemicals and 2,2'-azobis (methyl isobutyrate) (V-601) available from Wako Chemicals.

Suitable peroxide initiators include, but are not limited to, benzoyl peroxide, acetyl peroxide, lauroyl peroxide, decanoyl peroxide, dicetyl peroxydicarbonate, di(4-t-butylcyclohexyl) peroxydicarbonate (PERKADOX™ 16S, available from AKZO Chemicals), di(2-ethylhexyl) peroxydicarbonate, t-butylperoxypivalate (Lupersol™11, available from Atochem), t-butylperoxy-2-ethylhexanoate (Trigonox™ 21-C50, available from Akzo Chemicals, Inc.), and dicumyl peroxide.

Suitable persulfate initiators include, but are not limited to, potassium persulfate, sodium persulfate, and ammonium persulfate.

Suitable redox (oxidation-reduction) initiators include, but are not limited to, combinations of the above persulfate initiators with reducing agents such as sodium metabisulfite and sodium bisulfite; systems based on organic peroxides and tertiary amines, for example, benzoyl peroxide plus dimethylaniline; and systems based on organic hydroperoxides and transition metals, for example, cumene hydroperoxide plus cobalt naphthenate.

Other initiators include, but are not limited to pinacols, such as tetraphenyl 1,1,2,2-ethanediol.

Preferred thermal free-radical initiators are selected from the group consisting of peroxides and azo compounds that do not contain nitriles or basic groups. Most preferred initiators are V-601, Lupersol™ 11 and Perkadox™ 16S, and mixtures thereof, because of their preferred decomposition temperature is in the range of about 45° to 95° C. Additionally, they are generally inert toward cationic polymerization initiators.

The initiator is present in a catalytically-effective amount and such amounts are typically in the range of about 0.01 parts to 5 parts, and more preferably in the range from about 0.025 to 2 parts by weight, based upon 100 total parts by weight of monomer or monomer mixture. If a mixture of initiators is used, the total amount of the mixture of initiators would be as if a single initiator was used.

Photoinitiators that are useful for partially polymerizing alkyl acrylate monomer without crosslinking, to prepare syrups, include the benzoin ethers, such as benzoin methyl ether or benzoin isopropyl ether, substituted benzoin ethers, such as anisoin methyl ether, substituted acetophenones, such as 2,2-diethoxyacetophenone and 2,2-dimethoxy-2-phenylacetophenone, substituted alpha-ketols, such as 2-methyl-2-hydroxypropiophenone, aromatic sulfonyl chlorides, such as 2-naphthalene-sulfonyl chloride, and photoactive oximes, such as 1-phenyl-1,2-propanedione-2-(O-ethoxycarbonyl)oxime. They may be used in amounts, which as dissolved provide about 0.001 to 0.5 percent by weight of the alkyl acrylate monomer, preferably at least 0.01 percent.

Optionally, monohydroxy- and polyhydroxy-alcohols may be added to the curable compositions of the invention, as chain-extenders for the epoxy resin. Suitable examples of alcohols include but are not limited to methanol, ethanol, 1-propanol, 2-propanol, 1-butanol, 1-pentanol, 1-hexanol, 1-heptanol, 1-octanol, pentaerythritol, 1,2-propanediol, ethylene glycol, 1,4-butanediol, 1,5-pentanediol, 1,6-hexanediol, 1,4-cyclohexane dimethanol, 1,4-cyclohexanediol and glycerol.

Preferably, compounds containing hydroxyl groups, particularly compounds containing from about 2 to 50 hydroxyl groups and above all, compounds having a weight average molecular weight of from about 50 to 25,000, preferably from about 50 to 2,000, for example, polyesters, polyethers, polythioethers, polyacetals, polycarbonates, poly(meth) acrylates, and polyester amides, containing at least 2, generally from about 2 to 8, but preferably from about 2 to 4 hydroxyl groups, or even hydroxyl-containing prepolymers of these compounds, are representatives compounds useful in accordance with the present invention and are described, for example, in Saunders, *High Polymers, Vol. XVI*, "Polyurethanes, Chemistry and Technology," Vol. I, pages 32–42, 44–54 and Vol. II, pages 5–6, 198–99 (1962, 1964), and in *Kunststoff-Handbuch*, Vol. VII, pages 45–71 (1966). It is, of course, permissible to use mixtures of the above-mentioned compounds containing at least two hydroxyl groups and having a molecular weight of from about 50 to 50,000 for example, mixtures of polyethers and polyesters.

In some cases, it is particularly advantageous to combine low- melting and high-melting polyhydroxyl containing compounds with one another (German Offenlegungsschrift No. 2,706,297).

Low molecular weight compounds containing at least two reactive hydroxyl groups (molecular weight from about 50 to 400) suitable for use in accordance with the present invention are compounds preferably containing hydroxyl groups and generally containing from about 2 to 8, preferably from about 2 to 4 reactive hydroxyl groups. It is also possible to use mixtures of different compounds containing at least two hydroxyl groups and having a molecular weight in the range of from about 50 to 400. Examples of such compounds are ethylene glycol, 1,2- and 1,3-propylene glycol, 1,4- and 2,3-butylene glycol, 1,5-pentanediol, 1,6-hexanediol, 1,8-octanediol, neopentyl glycol, 1,4-cyclohexane dimethanol, 1,4-cyclohexanediol, trimethylolpropane, 1,4-bis-hydroxymethyl cyclohexane, 2-methyl-1,3-propanediol, dibromobutenediol (U.S. Pat. No. 3,723,392), glycerol, trimethylolpropane, 1,2,6-hexanetriol, trimethylolethane, pentaerythritol, quinitol, mannitol, sorbitol, diethylene glycol, triethylene glycol, tetraethylene glycol, higher polyethylene glycols, dipropylene glycol, higher polypropylene glycols, dibutylene glycol, higher polybutylene glycols, 4,4'-dihydroxy diphenyl propane and dihydroxy methyl hydroquinone.

Other polyols suitable for the purposes of the present invention are the mixtures of hydroxy aldehydes and hydroxy ketones ("formose") or the polyhydric alcohols obtained therefrom by reduction ("formitol") which are formed in the autocondensation of formaldehyde hydrate in the presence of metal compounds as catalysts and compounds capable of enediol formation as co-catalysts (German Offenlegungsschrift Nos. 2,639,084, 2,714,084, 2,714,104, 2,721,186, 2,738,154 and 2,738,512).

It is contemplated that polyfunctional alcohols such as carbowaxes poly(ethylene glycol), poly(ethylene glycol methyl ether), poly(ethylene glycol) tetrahydrofurfuryl ether, poly(propylene glycol) may also be used in the compositions of the present invention.

It is also within the scope of this invention to add optional adjuvants provided they are not detrimental to the cationic cure and include, for example, thixotropic agents; plasticizers; toughening agents such as those taught in U.S. Pat. No. 4,846,905; pigments; fillers; abrasive granules, stabilizers, light stabilizers, antioxidants, flow agents, bodying agents, flatting agents, colorants, binders, blowing agents, fungicides, bactericides, surfactants; glass and ceramic beads; and reinforcing materials, such as woven and nonwoven webs of organic and inorganic fibers, such as polyester, polyimide, glass fibers and ceramic fibers; and other additives as known to those skilled in the art can be added to the compositions of this invention. These can be added in an amount effective for their intended purpose; typically, amounts up to about 25 parts of adjuvant per total weight of formulation can be used. The additives can modify the properties of the basic composition to obtain a desired effect. Furthermore, the additives can be reactive components such as materials containing reactive hydroxyl functionality. Alternatively, the additives can be also substantially unreactive, such as fillers, including both inorganic and organic fillers.

Optionally, it is within the scope of this invention to include photosensitizers or photoaccelerators in the radiation-sensitive compositions. Use of photosensitizers or photoaccelerators alters the wavelength sensitivity of radiation-sensitive compositions employing the latent catalysts of this invention. This is particularly advantageous when the latent catalyst does not strongly absorb the incident radiation. Use of a photosensitizer or photoaccelerator increases the radiation sensitivity allowing shorter exposure times and/or use of less powerful sources of radiation. Any photosensitizer or photoaccelerator may be useful if its triplet energy is at least 45 kilocalories per mole. Examples of such photosensitizers are given in Table 2-1 of the reference, S. L. Murov, *Handbook of Photochemistry*, Marcel Dekker Inc., N.Y., 27–35 (1973), and include pyrene, fluoranthrene, xanthone, thioxanthone, benzophenone, acetophenone, benzil, benzoin and ethers of benzoin, chrysene, p-terphenyl, acenaphthene, naphthalene, phenanthrene, biphenyl, substituted derivatives of the preceding compounds, and the like. When present, the amount of photosensitizer or photoaccelerator used in the practice of the present invention is generally in the range of 0.01 to 10 parts, and preferably 0.1 to 1.0 parts, by weight of photosensitizer or photoaccelerator per part of organometallic salt or onium salt.

Glass microbubbles having an average diameter of 10 to 200 micrometers can be blended with polymerizable compositions of this invention as taught in U.S. Pat. No. 4,223,067. If the microbubbles comprise 20 to 65 volume percent of the pressure-sensitive adhesive, the polymerized product will have a foam-like appearance and be suitable for uses to which foam-backed pressure-sensitive adhesive tapes are useful.

Electrically conducting particles, as taught in U.S. Pat. No. 4,606,962 can be blended with the polymerizable compositions of this invention. The conducting particles, such as solid metal particles, carbon black, metal-coated particles, or metal flakes, added to the polymerizable compositions of this invention can provide electrical conduction between semiconductor chips and circuit traces. Advantageously, such a conducting adhesive layer eliminates solder and provides better mechanical strength. Furthermore, more connections per area (pitch) can be realized using a conducting adhesive. The elimination of solder is environmentally safer, in that hazardous solvents and lead from solder are eliminated. In addition, thermally conductive particles, such as metal oxide particles, can be blended with the polymerizable compositions of the present invention.

Other materials that can be blended with the polymerizable compositions of this invention include tackifiers, reinforcing agents, and other modifiers, some of which may copolymerize with the free radically or cationically polymerizable monomers or photopolymerize independently. However, the addition of any such material adds complexity and hence expense to an otherwise simple, straightforward, economical process and is not preferred except to achieve specific results.

While it is preferred that solvents are not used in preparing the polymerizable compositions of the present invention, solvents, preferably organic, can be used to assist in dissolution of the catalyst system in the free radically and cationically polymerizable monomers. It may be advantageous to prepare a concentrated solution of the organometallic complex salt or the onium salt in a solvent to simplify the preparation of the polymerizable composition. Representative solvents include acetone, methyl-ethyl-ketone, cyclopentanone, methyl cellosolve acetate, methylene chloride, nitromethane, methyl formate, gamma-butyrolactone, propylene carbonate, and 1,2-dimethoxyethane (glyme).

Irradiation sources that provide light in the region from 200 to 800 nm are effective in the practice of this invention. A preferred region is between 250 to 700 nm. Suitable sources of radiation include mercury vapor discharge lamps, carbon arcs, quartz halogen lamps, tungsten lamps, xenon lamps, fluorescent lamps, lasers, sunlight, etc. The required amount of exposure to effect polymerization is dependent upon such factors as the identity and concentrations of the photo-activatable catalyst system, the particular free radically and cationically polymerizable monomers, the thickness of the exposed material, type of substrate, intensity of the radiation source and amount of heat associated with the radiation.

Preferred composition of the invention comprises monomer ratios of 10–70, preferably 20–50% epoxy monomer(s) and 30–90%, preferably 50–80% acrylate monomer(s).

Partially Pre-polymerization Syrups

The curable adhesive composition can be prepared using a free radically polymerizable syrup (also referred to as "syrup"), that is partially polymerized free radical monomers (1% to 30% conversion), or a mixture of partially polymerized free radical monomers and substantially unpolymerized epoxy monomers, and optional adjuvants.

Method 1

A first step in the preparation of a syrup is to mix free radically polymerizable monomers with a catalytically effective amount of a free radical initiator, preferably a free radical photoinitiator. Preferably, the free radical photoinitiator is not a crosslinking agent and is generally present in an amount within the range of 0.001 to 5.0% by weight of the polymerizable composition, preferably in the range of 0.01 to 1.0% by weight of the polymerizable composition.

A second step, that is simultaneous and concurrent with step (3) is to purge the system (the polymerizable composition, as well as the reaction environment), for example by bubbling an inert gas, such as $N_2$, Ar, or He through the polymerizable composition to remove any residual oxygen.

A third step is to apply energy to the free-radically polymerizable composition to allow it to polymerize such that the viscosity is increased to within a range of 0.3 to 20.0 Pascal seconds at ambient temperature. Preferably, the viscosity after this step is in the range of 500 to 4000 cps (0.5 to 4.0 Pa-sec). The increased viscosity provides a syrup that is more suitable as a coating composition for production of the articles of the invention. The polymerizable composition may be polymerized using any well-known free-radical polymerization technique and quenched with air to attain the desired viscosity. Preferably, the free radical initiator is a photoinitiator, and the partial polymerization may be stopped at any point by eliminating the irradiation source.

A fourth step is to mix the cationically polymerizable monomers and optional alcohol-containing material into the syrup.

A fifth step is to mix at least one organometallic complex or onium salt and at least one additional free-radical initiator, into the syrup of step three. The additional free radical initiator can be the same as the initiator of step 1 or different. Optional bireactive free radically polymerizable monomer, bifunctional monomer, adjuvants may be added to the syrup at this time.

A sixth step is to degas the curable compositions under vacuum to remove bubbles, volatile solvents, dissolved air, oxygen, and the like. Although it is preferable to do this step just prior to coating, it may be carried out at any time from a few hours to several weeks prior to coating. To insure stability of the degassed curable compositions, it is preferable to keep them from unwanted exposure to light.

Method 2

A first step in this alternative preparation for a syrup is to mix the polymerizable monomers (cationically and free radically polymerizable monomers) with a catalytically effective amount of at least one free radical initiator. Preferably, the free radical initiator is not a crosslinking agent and is generally present in an amount within the range of 0.001 to 5.0% by weight of the polymerizable composition, preferably in the range of 0.01 to 1.0% by weight of the polymerizable composition.

A second step, that is simultaneous and concurrent with step (3) is to purge the system (the polymerizable composition, as well as the reaction environment), for example by bubbling an inert gas, such as $N_2$, Ar, or He, through the polymerizable composition to remove any residual oxygen.

A third step is to apply energy to the polymerizable composition to allow the free radically polymerizable monomers to polymerize such that the viscosity is increased to within a range of 0.3 to 20.0 Pascal seconds (Pa-sec) at ambient temperature. Preferably, the viscosity after this step is in the range of 0.5 to 2.0 Pa-sec. The increased viscosity provides a syrup that is more suitable as a coating composition for production of the articles of the invention. The polymerizable composition may be polymerized using any well-known free-radically polymerization technique and quenched with air to attain the desired viscosity.

A fourth step is to mix at least one complex or onium salt, and at least one additional free radically polymer, any optional bireactive free radically polymerizable monomer, bifunctional monomer, adjuvants into the syrup of step two.

A fifth step is to degas the curable compositions under vacuum to remove bubbles, dissolved air, volatile solvents, oxygen, and the like. Although it is preferable to do this step just prior to coating, it may be carried out at any time from a few hours to several weeks prior to coating. To insure stability of the degassed curable compositions, it is preferable to keep them from unwanted exposure to light.

Once the curable adhesive compositions have been prepared using either Method 1 or Method 2, the compositions can be coated onto a carrier web and polymerized to produce a curable pressure sensitive adhesive having an enhanced shelf life such that the pressure sensitive adhesive properties are retained for a time period longer than similar art known epoxy-acrylate curable adhesives.

Thermal Processing

Thermally initiated free radical polymerizations of the invention are carried out using a single heating zone in the polymerization zone or multiple heating zones in the polymerization zone. The curable adhesive composition, can be coated via a coating station onto at least one major surface of a carrier web. In many situations, it may be desirable to coat between a bottom carrier web and an upper carrier web.

Once coated, the curable adhesive composition is processed through at least one polymerization zone wherein the curable adhesive composition is thermally polymerized by heating the same within a thermal buffer having a heat transfer process characterized by a heat transfer coefficient of at least 25 W/(m$^2$·K) to a temperature sufficient to initiate thermal polymerization for a period a time sufficient to effect about 5–100% conversion of the free-radically polymerizable monomeric mixture or prepolymerized syrup to polymer. When the process is carried out in one heating zone, it is preferred that the time and temperature be such that at least 90% of the free radically polymerizable monomeric mixture or prepolymerized syrup is converted to polymer. Furthermore, it is advantageous that the heat transfer coefficient for the heat transfer process within the thermal buffer be relatively high, preferably 100 W/(m$^2$·K) and most preferably at least 500 W/(m$^2$·K).

Thermal control of the polymerization process of the current invention can be stated as follows. As the polymerization occurs throughout the cross-section of the polymerization mixture, the energy balance on a small unit volume of polymerizable mixture contains components relating to the internal heat generation created by the polymerization reaction and on the heat transfer by conduction into and out of the small unit volume from the surrounding units volumes. The rate of heat flow out of a unit volume must be fast enough to prevent an excessive temperature rise within the unit volume caused by the reaction exotherm.

If more than one heating zone is used, the first heating zone of the polymerization zone can effect as little as 5% conversion of the free radically polymerizable monomeric mixture. Preferably, the multi-stage process (that is, use of more than one heating zone or the combination of a preheating zone and at least one heating zone) is conducted continuously, that is, in-line without interruption of the polymerization process. The coated mixture is heated to a first temperature and maintained for a first time period and then immediately moved into a second heating zone with no interruption of the process between the heating zones. There may also be a preheating zone wherein the coated mixture is heated to a point just before commencement of polymerization of the free radically polymerizable monomeric component(s). When using more than one heating zone, the temperature of the second heating zone is generally greater than that of the first heating zone.

It is within the scope of the present invention to use more than two heating zones. When each zone subsequent to the first heating zone is used to initiate thermal initiators, the temperature of each subsequent zone is higher than the previous zone.

When a single coated carrier web is used to prepare PSAs of the invention, polymerization is preferably carried out such that oxygen is essentially excluded from the polymerization zone. However, when the free-radically polymerizable monomeric mixture or partially prepolymerized free radically polymerizable monomeric mixture is coated between two carrier webs, it is generally not necessary to exclude oxygen from the polymerization zone.

The heat transfer process within the thermal buffer can include but is not limited to forced or impinged air, helium, or hydrogen; heat transfer via conduction, such as a metal platen, or heated metal rolls; or via convective transfer to liquids, such as water, perfluorinated liquids, glycerin, or propylene glycol. Heat transfer processes that are characterized by having heat transfer coefficients of at least 25 W/(m²·K) are considered to be within the scope of the present invention. Additionally, it is also within the scope of the present invention to add salts or low molecular weight organic compounds to a fluid heat transfer medium to alter the characteristics of the thermal buffer, such as providing for reduced oxygen content, solubility of monomers and the like. It should be noted that it is not necessary within the thermal buffer to surround the coated construction with the heat transfer medium; contact on one side of the carrier web or polymerization mixture may be sufficient. Furthermore, physical properties, such as boiling point of the heat transfer fluid should be taken into consideration when designing a thermal buffer, along with initiator type and concentration, processing temperature and the like.

Curable adhesive tapes of the present invention, such as transfer, microstructured, foamed, and/or opaque tapes can be prepared as stacked layers and/or in multiple layers, wherein more than one layer of polymerizable compositions is coated between more than one solid sheet material, then passed into at least one heating zone to effect polymerization of all layers. This is an advantage over photopolymerizable systems, wherein the polymerizing radiation may have difficulty reaching into all layers of the construction equally. An additional advantage is that two or more different liner materials may be used simultaneously in order to improve the efficiency and throughput of tape production facilities. As will be appreciated by those skilled in the art, such liner material can have a low adhesion surface(s) and can be removed after polymerization is complete or one such surface can be a tape backing material that remains permanently affixed to the curable adhesive product.

It is also contemplated that multiple coating stations can be positioned serially or in parallel up stream from the polymerization zone. This can be accomplished with or without the use of multiple upper carrier webs.

A stacked tape configuration is also within the scope of the present invention. For example a four stack layered tape having a bottom liner and three liners separating four coated layers of polymerizable composition of the invention can be constructed using multiple coating station. Optionally, a top-most (e.g., fifth) layer is within the scope of the invention when, for example, it is desired to exclude oxygen from the top-most coated layer. Furthermore, it should be appreciated that a four-layer configuration is merely a single contemplated configuration. For example, the number of layers should not be construed to be limited to four and could be two or more, the liners used could be different materials, the curable syrup could be different for each layer, or even multilayered between each liner.

A multi-layered tape configuration is also within the scope of the present invention, wherein two or more layers could be coated one atop the other upon a single liner. Optionally, such a multilayer may be part of a stacked configuration, as previously described.

The cured coated constructions can be post-treated or post-conditioned, that is, further treated after polymerization of the free-radically polymerizable component(s), but before the cationically cured component is cured. Such treatments can be useful, for example to minimize monomer residuals, increase shear strength, corona-treat the coating, and provide cross-linking. Post treatment techniques typically involve an energy source such as microwave, e-beam, IR, electromagnetic radiation, radiant heat, forced air, impinged air, metal platens, and heated metal rolls. It will be appreciated that any post-treatment or conditioning process typically used by those skilled in the art for treating tapes, films and the like can be used in combination with the present invention.

Thermally initiated free-radical polymerizations of the invention may also be carried out in an extruder. See, for example, U.S. Pat. No. 4,619,979, the contents of which are incorporated herein by reference, for a detailed description of free-radical polymerizations in an extruder.

Extruder polymerizations, also known as "reactive extrusions," are similar to bulk polymerizations but overcome the drawbacks of poor mixing and poor heat transfer in the viscous reaction mass, and of loss of control over molecular weight distribution in the resultant polymer. An extruder is characterized as being a wiped surface reactor comprising a shell or vessel which contains at least one rotor having a wiping portion located close to the inside surface of the shell and a root portion which is spaced substantially further from the shell than the wiping portion. As the rotor is rotated, the wiping portion passes close enough to the inside surface of the shell to clean the surface and form a seal when the reactor contains monomer and/or polymer but not so close as to cause permanent deformation of either the rotor or shell. It is necessary that the root surface of the rotor also be wiped or cleaned continuously during operation of the reactor.

Intermeshing twin screw extruders may be used as wiped surface reactors. Although corotating twin screw extruders may be used, counter-rotating twin screw extruders are preferred. The counter-rotating extruder acts as a positive displacement pump conveying the reacting stream, and it also behaves like a series of small mixing zones or continuous stirred tank reactors. The counter-rotating twin screw extruder also gives good control over the reaction temperature, thus giving the required control over polymer molecular weight and molecular weight distribution.

Polymerization in an extruder can be easily carried out in an oxygen-free manner, since the extruder itself is sealed, and all reactants can easily be purged of oxygen and stored in an inert atmosphere prior to being pumped into the extruder. Thus, polymerization is carried out in an atmosphere sufficiently free of oxygen so that no serious inhibition of free-radical polymerization occurs.

When the monomeric mixture is converted to polymer and is conveyed to the end of the extruder, it can be conveniently extruded or coated directly onto a suitable substrate (e.g., a tape backing or a liner), since there is no solvent or reaction medium to be evaporated. When the reaction mixture exits the extruder and is exposed to air, polymerization ceases. The coated PSA of the invention thus obtained can be stored for an extended period before its final use.

In use, the counter-rotating twin screw extruder is divided into a number of sections having controllable configurations of both the extruder screws and the barrel. Thus, extruder screws may be composed of a number of separate sections which may fit onto a common drive shaft by means of a keyway and which may be disassembled and rearranged in various orders and orientations. For example, the screw may have one pitch in the inlet section, another pitch in the middle of the screw length and yet another pitch toward the exit end of the extruder. Or, while most sections of the screw may be oriented to convey the reaction mass towards the extruder exit, some sections may be reversed to increase dwell time and mixing. Finally, barrel sections may be configured as either heating or cooling sections.

Residence time and time distribution needed to complete the reaction generally in a wiped surface reactor is controlled by the geometry, the rotational direction, and the rotational speed of the extruder screws. Typical residence times for production of PSAs of the present invention are in the range of 5 minutes to 15 minutes.

In practice, a monomer mixture or prepolymer as described in Method One or Method Two, above, is prepared in a premix tank or holding tank where it is degassed and covered with a blanket of inert gas such as nitrogen. From the holding tank, it may optionally be pumped to a static mixer, where it may optionally be preheated to a temperature in the range of 35° C. to 55° C., then introduced into the inlet of the wiped surface reactor at a pressure sufficient to maintain process stability. After an appropriate residence time, the resulting polymeric material is withdrawn from the reactor and directed to a coater or otherwise packaged.

In another aspect of this invention a mixture of free-radically polymerized polymer, cationically-polymerizable monomer and catalyst system may be melt blended. A melt blend is formed by heating the mixture to at least the softening point of the free-radically polymerized polymer, typically between about 100° C. and 150° C., with mechanical agitation to produce a homogeneous mixture. During the process of melt-blending, the free-radically polymerized polymer, cationically-polymerizable monomer and catalyst system are mixed, such as in the mixing barrel of a single screw or twin-screw extruding apparatus wherein the mixture is heated during mixing in the absence of actinic radiation that would activate the catalyst. See, for example, "Polymer Extrusion" by Chris Rauwendaal, ed. Hanser Publishers, 1986, pages 322–330, for a detailed description of mixing in screw extruders.

Free-radically polymerized polymer, cationically-polymerizable monomer and catalyst system are combined in a melt mixing apparatus where they are heated and melt blended to form a homogeneous mixture. After an appropriate residence time, the resulting polymeric material is withdrawn from the melt mixer and directed to a coater or otherwise packaged and cooled.

Free-radically polymerized polymers may be prepared in any of a number means known in the art, such as photopolymerization or thermal-polymerization, either of which can be carried out in the bulk (100% solids) or in solution. If polymerization is carried out in solution, the solvent must be removed prior to melt blending. Preferably the (meth) acrylate polymer is prepared by photo-polymerization in the bulk with the cationically-polymerizable monomer present.

Curable pressure sensitive adhesive compositions of the present invention are useful for coatings, foams, shaped articles, adhesives, filled or reinforced composites, abrasives, caulking and sealing compounds, casting and molding compounds, potting and encapsulated compounds, impregnating and coating compounds, and other applications which are known to those skilled in the art.

The present process may be used to manufacture many different types of tapes. Various flexible backings and liners (also referred to as "substrates") may be used, including films (transparent and nontransparent), cloths, papers, non-woven fibrous constructions, metal foils, aligned filaments, and the like. The backings and liners are chosen to be compatible with the processing parameters of the present invention. For example, an untreated paper liner may not be the backing or liner of choice when using a fluid heat exchange medium such as water.

The polymerizable mixture or prepolymerized syrup can be coated onto any suitable substrate, using coating techniques known to those skilled in the art. Furthermore, the polymerizable mixture can be coated onto a moving substrate that does not become a part of the finished article, so as to produce a free-standing film or sheeting. The compositions are typically coated to a dry thickness that ranges between 0.025 to 5.0 mm.

After the curable pressure sensitive adhesive compositions have been fabricated into an article, such as, tape, or transfer film, the articles should be stored in the absence of actinic radiation which is capable of activating the catalyst system.

To convert the curable pressure sensitive adhesive into a structural or semi-structural adhesive, the curable pressure sensitive adhesive is irradiated. Irradiation sources that provide light in the region from 200 to 800 nm are effective in the practice of this invention. A preferred region is between 250 to 700 nm. Suitable sources of radiation include mercury vapor discharge lamps, carbon arcs, tungsten lamps, xenon lamps, fluorescent lamps, lasers, sunlight, etc. The required amount of exposure to effect polymerization is dependent upon such factors as the identity and concentrations of the photoinitiated catalyst system, the particular free-radically and cationically polymerizable monomers, the thickness of the exposed material, type of substrate, intensity of the radiation source and amount of heat associated with the radiation.

Optionally, the photoactivated adhesive (that is, the structural or semi-structural adhesive) can be heat treated to complete conversion. Suitable sources of heat to cure the thermosetting (epoxy) compositions of the invention include induction heating coils, ovens, hot plates, heat guns, IR sources including lasers, microwave sources, etc.

Objects and advantages of this invention are further illustrated by the following examples, but the particular materials and amounts thereof recited in these examples, as well as other conditions and details, should not be construed to unduly limit this invention. All materials are commercially available, for example from Aldrich Chemical Company or known to those skilled in the art unless otherwise stated or apparent.

| | Glossary |
|---|---|
| 350BL bulbs | fluorescent bulbs available from Sylvania Corp. under the trade designation F15T8/350BL |
| CpFeXyl SbF$_6$ | (eta$^6$-xylenes(mixed isomers))(eta$^5$-cyclopentadienyl)iron(1+) hexafluoroantimonate |
| EPON 1001F | diglycidyl ether of bisphenol A (epoxy equivalent weight = 525–550 g/eq) (available from Shell Chemical Co.) |
| EPON 828 | diglycidyl ether of bisphenol A (epoxy equivalent weight =185–192 g/eq) (available from Shell Chemical Co.) |

Glossary

| | |
|---|---|
| ERL-4206 | vinyl cyclohexene dioxide (available as BAKELITE ERL-4206 from Union Carbide Corp.) |
| ERL-4221 | 3,4-epoxycyclohexylmethyl-3,4-epoxycyclohexane carboxylate (available as BAKELITE ERL-4221 from Union Carbide Corp.) |
| ESACURE KB-1 | 2,2-dimethoxy-2-phenyl acetophenone (available from Sartomer Chemicals) |
| IBA | isobutyl acrylate |
| nBA | n-butyl acrylate |
| PERKADOX 16 | di(4-t-butylcyclohexyl)peroxydicarbonate(available from Akzo Chemicals, Inc.) |
| POEA | phenoxy ethyl acrylate |
| Super Actinic bulbs | fluorescent bulbs available from Philips Lighting under the trade designation TLD 15W/03 |
| tBOX | di-t-butyl oxalate (available from Aldrich Chemical Company) |
| THFA | tetra hydrofurfuryl acrylate |
| UVI-6974 | 50% mixed triarylsulfonium hexafluoroantimonate salts in propylene carbonate (available as CYRACURE UVI-6974 from Union Carbide Corp.) |
| V-601 | dimethyl 2,2'-azobisisobutyrate (available from Wako Chemical Co.) |

EXAMPLES

Test Methods

Differential Scanning Calorimetry (DSC)

Differential Scanning Calorimetry was used to measure the exothermic heat of reaction (Joule/gram (J/g)) associated with the cure of the cationically polymerizable monomer. The exotherm profile, that is, peak temperature, onset temperature, etc., of the exotherm provided information on conditions that were needed to cure the material. DSC samples were typically 6 to 12 milligrams and were run in sealed pans on a Seiko Instruments DSC 220C at a heating rate of 10° C./min. The onset temperature ($T_{onset}$) is the point of intersection between the tangents drawn to the curve along the baseline, and after the onset of the exotherm at the point of maximum change in slope. The integrated energy under the exothermic peak is related to the extent of cure. For a stable composition, more of that exotherm should remain with time indicating the composition is not curing prematurely. For an unstable composition, the exotherm energy will decrease more rapidly with time indicating that the composition has undergone some degree of cure prematurely.

Photo Differential Scanning Calorimetry (PDSC)

Photo Differential Scanning Calorimetry was used to measure the exothermic heat of reaction (Joule/gram (J/g)) associated with the cure of the cationically polymerizable monomer upon exposure to light. PDSC samples were typically 6–12 milligrams and were run in open pans on a Seiko Instruments PDC121 at a heating rate of 10° C./minute after a photolysis step using a 200 watt mercury-xenon lamp. The analysis of the exotherm profile was conducted in the same manner as described under the DSC description.

Overlap Shear Strength

Samples were prepared by cutting 12.7 mm×25.4 mm specimens from the adhesive film. The silicone release liner was removed from one side of the specimen and the exposed adhesive was applied to one end of an aluminum test coupon measuring 1.7 mm×25.4 mm×50.8 mm. The silicone release liner was removed from the other side of the specimen and another identical aluminum coupon was placed over the adhesive such that there was a 12.7 mm overlap of the coupons and with the uncoated ends of the coupons aligned in opposite directions from each other. The coupons were clamped together and thermally cured. The prepared samples were cooled for at least 1 hour at about 22° C. before testing. The lap shear was determined using an Instron Model 1122 tensile tester according to ASTM Test Method D1002-72 with a crosshead speed of 5 cm/min. The lap shear strength is reported in Megapascals (MPa).

180° Peel Adhesion

Peel adhesion samples were prepared by applying a 12.7 mm wide strip of the PSA tape to a desired panel (either 1.7 mm thick 50 mm×125 mm aluminum or standard 25 mm×75 mm glass microscope slide). The average peel adhesion value was determined by doubling one end of the adhesive strip back over itself at 180°, and measuring the force required to peel the tape from the substrate at a rate of 30.5 cm/minute using an Instron Model 1122 tensile tester. The 180° peel adhesion values were reported in Newton/centimeters (N/cm). Further details of this test are shown in "Test Methods for Pressure Sensitive Tapes", available from the Specifications and Technical Committee of the Pressure Sensitive Tape Council, 5700 Old Orchard Road, First Floor, Skokie, Ill. 60077, under the test designation PSTC-1.

Example 1: Reactive Extrusion of poly(acrylate)

A mixture of 60 parts 75:25 ratio of phenoxyethyl acrylate:isobornyl acrylate, 40 parts 75:25 ratio of EPON™ 828:EPON™ 1001F, 3.8 parts 1:1 ratio of cyclohexane dimethanol:1,6-hexanediol, 1.2 parts WAKO V-601™ (25 weight percent in propylene carbonate) and 1.6 parts CpFeXyl SbF$_6$ (25 weight percent in propylene carbonate) was metered into the throat of an 18 mm counter-rotating twin screw extruder by means of a peristaltic pump. The mixture was conveyed down the length of the extruder, operated at a screw speed of 50 rpm, through 8 heated zones (72°, 81°, 92°, 96°, 105°, 110°, 115°, and 120° C., respectively), exiting the extruder at 120° C. as a relatively low viscosity, foamy viscoelastic mass. DSC analysis of the material, cooled to room temperature, indicated a peak exotherm temperature of 229.9° C. and a cure exotherm of 74.6 J/g. PhotoDSC analysis showed a peak exotherm temperature shift to 105.2° C. and an increase in cure exotherm to 173 J/g after a two-minute photolysis step. After 429 days of storage in the dark at room temperature, photoDSC of the sample gave a peak exotherm temperature of 110.3° C. and a cure exotherm of 171 J/g. This example shows that the PSA prepared by reactive extrusion has a very long shelf life, with essentially no advancement of the epoxy resin over a 14-month period.

Adhesive tapes were prepared by pressing this polymeric material to a thickness of 0.200 mm between a 0.036 mm poly(ethylene terephthalate) film and 0.100 mm silicone-coated poly(ethylene terephthalate) film using a heated platen press at a temperature of 170° C. After cooling to room temperature these tapes were tested for 180° peel adhesion to glass and aluminum substrates with and without curing. Curing was carried out by exposing the previously prepared panels to irradiation under Super Actinic™ bulbs for 5 minutes and then heating in an oven at 100° C. for 10 minutes. The resulting peel values are summarized below.

| Sample | Average Peel Adhesion(N/cm width) | |
|---|---|---|
| | Glass | Aluminum |
| Before cure | 0.97 | 10.3 |
| After cure | backing failure* | backing failure* |

*The 0.36 mm poly(ethylene terephthalate)film backing was determined to have a break strength of 31.3 N/cm width, indicating that a peel adhesion greater than this value had developed as the result of curing.

Example 2: Shelf-life of a Coated Sample Prepared by Thermal Polymerization

A mixture of 30 parts phenoxyethyl acrylate, 30 parts isobornyl acrylate, 40 parts ERL-4221™ epoxy monomer and 0.01 parts KB-1 photoinitiator was prepared and purged with nitrogen and irradiated with 350BL fluorescent bulbs with stirring until the viscosity of the mixture was suitable for coating (about 1055 kPa).

A mixture of 100 parts of the above syrup, 0.4 parts ground CpFeXyl SbF$_6$, 0.8 parts methyl ethyl ketone, 0.1 parts hexanediol diacrylate, 0.1 parts V601 initiator, 0.075 parts PERKADOX™ 16 initiator and 4.0 parts 1:1 mixture of 1,4-cyclohexane dimethanol:1,6-hexane diol was degassed and knife-coated at 0.125 mm thickness between two 0.050 mm silicone-coated white poly(ethyleneterephthalate) films under subdued lighting. The sandwich construction was placed on an aluminum plate heated to 90° C. for 15 minutes, then cooled to room temperature. DSC analysis of the acrylate-cured film, in the absence of a photopolymerization step, showed an exotherm onset temperature of 210.4° C., a peak exotherm temperature of 226.8° C. and a cure exotherm of 45.2 J/g. PhotoDSC of the sample showed an exotherm onset temperature of 77.9° C., a peak exotherm at 94.6° C. and a cure exotherm of 204.7 J/g after a five-minute photolysis step.

The cure exotherm energy was monitored as a function of time in subdued lighting at room temperature to determine the shelf-stability of the samples. The measured cure exotherm energy after a photolysis step is summarized below.

TABLE 1

| Days at Room Temperature | Cure Energy (J/g) | Appearance |
|---|---|---|
| 0 | 204.7 | transparent, tacky PSA |
| 29 | 188.7 | transparent, tacky PSA |
| 44 | 185.9 | transparent, tacky PSA |
| 89 | 174.1 | transparent, tacky PSA |
| 139 | 171.1 | transparent, tacky PSA |
| 217 | 195.3 | transparent, tacky PSA |
| 258 | 193.9 | transparent, tacky PSA |
| 332 | 202.1 | transparent, tacky PSA |
| 391 | 186.3 | transparent, tacky PSA |
| 398 | 213.3 | transparent, tacky PSA |
| 422 | 187.9 | transparent, tacky PSA |

This example shows that no advancement of the epoxy monomer has taken place after more than 14 months of storage at room temperature, and that the PSA has excellent shelf life after thermal polymerization.

Examples 3–6 and 1C to 4C: Photo-polmerization of the Acrylate vs. Thermal-polymerization A coatable acrylate syrup was made that contained 60 parts by weight of nBA and 40 parts by weight of THFA. 0.04 parts by weight of KB-1 photoinitiator were added to the acrylate mixture, the mixture was purged with bubbling nitrogen, and the acrylate monomers were taken to approximately 10% polymerization conversion by irradiation with 350BL fluorescent bulbs. 60 parts by weight of this syrup was mixed with 40 parts by weight of an epoxy mixture that consisted of 80 parts by weight of EPON 828 and 20 parts by weight of EPON 1001F. Eight different formulations were prepared from this epoxy/acrylate mixture consisting of the components and quantities summarized in the Table 2 (all quantities are parts by weight).

TABLE 2

| Component | C1 | C2 | C3 | C4 | 3 | 4 | 5 | 6 |
|---|---|---|---|---|---|---|---|---|
| Epoxy/Acrylate Mixture | 100 | 100 | 100 | 100 | 100 | 100 | 100 | 100 |
| Cyclohexane dimethanol | — | 4.0 | — | 4.0 | — | 4.0 | — | 4.0 |
| t-BOX | — | — | 0.4 | 0.4 | — | — | 0.4 | 0.4 |
| KB-1 | 0.6 | 0.6 | 0.6 | 0.6 | — | — | — | — |
| CpFeXylSbF$_6$ | 0.4 | 0.4 | 0.4 | 0.4 | 0.4 | 0.4 | 0.4 | 0.4 |
| V-601 | — | — | — | — | 0.1 | 0.1 | 0.1 | 0.1 |
| PERKADOX P-16 | — | — | — | — | 0.15 | 0.15 | 0.15 | 0.15 |

Prior to coating, each of the formulations was de-aerated in a vacuum chamber, then knife coated at 0.75 mm thickness between two 0.100 mm transparent polyethylene terephthalate release liners. Samples C1 through C4 were irradiated for 13 minutes with 350BL fluorescent bulbs at a light dosage of 1960 mJ/cm$^2$. These films were transparent, tacky, self-supporting pressure sensitive adhesives. Samples 3 through 5 were immersed in 83° C. water for 15 minutes followed by 10 minutes in a 100° C. oven. These films were also transparent, tacky, self-supporting pressure sensitive adhesives.

Samples of these adhesives were used to bond 50.8 mm×25.4 mm×1.7 mm aluminum panels. Prior to bonding, the panels were wiped clean with isopropanol. Samples 3 through 5 were irradiated for 5 minutes under Super Actinic™ bulbs prior to preparing the bond. An overlap joint of approximately 1.2 cm in length was formed and the bonded strips were placed in an air circulating oven at 100° C. for 30 minutes. The overlap shear bond strength was measured using an Instron Tensile Tester, model #1122. The jaw separation rate was 5 cm/min. The results are summarized in Table 3.

TABLE 3

| Sample | Overlap Shear Bond Strength (MPa) | Bond Failure Mode |
| --- | --- | --- |
| C1 | 4.48 | Adhesive |
| C2 | 6.72 | Adhesive |
| C3 | 6.53 | Adhesive |
| C4 | 7.52 | Adhesive |
| 3 | 1.01 | Adhesive |
| 4 | 1.73 | Adhesive |
| 5 | 7.16 | Adhesive |
| 6 | 5.43 | Adhesive |

Samples 3 and 4 were found not to be fully cured. Additional overlap shear panels were prepared in the same manner as described above with the exception that the bonded strips were placed in an air circulating oven at 120° C. for 30 minutes. The overlap shear bond strength of these samples was measured as described above and the results are tabulated below.

| Sample | Overlap Shear Bond Strength (MPa) | Bond Failure Mode |
| --- | --- | --- |
| 3 | 3.30 | adhesive |
| 4 | 5.63 | adhesive |

The room temperature shelf-stability of these samples was monitored by determining the epoxy cure exotherm energy using a Seiko DSC as a function of time at room temperature. Samples 3 through 6 were irradiated for 5 minutes under Super Actinic™ bulbs prior to analyzing in the DSC. Samples C1 through C4 were analyzed without the photolysis step.

TABLE 4

| Sample | 2 days at RT | 15 days at RT | 33 days at RT |
| --- | --- | --- | --- |
| C1 | 153.1 J/g (tacky) | 77.2 J/g (low tack) | 21.2 J/g (no tack) |
| C2 | 137.3 J/g (tacky) | 47.0 J/g (low tack) | 21.0 J/g (no tack) |
| C3 | 149.2 J/g (tacky) | 76.6 J/g (low tack) | 30.4 J/g (no tack) |
| C4 | 139.7 J/g (tacky) | 60.0 J/g (low tack) | 18.5 J/g (no tack) |
| 3 | 142.0 J/g (tacky) | 152.5 J/g (tacky) | 158.9 J/g (tacky) |
| 4 | 148.7 J/g (tacky) | 146.4 J/g (tacky) | 150.1 J/g (tacky) |
| 5 | 159.8 J/g (tacky) | 159.8 J/g (tacky) | 166.0 J/g (tacky) |
| 6 | 147.5 J/g (tacky) | 157.7 J/g (tacky) | 156.6 J/g (tacky) |

After 33 days of storage at room temperature samples C1 through C4, those that were photo-polymerized, were cured to a significant extent and no longer remain tacky or function as pressure sensitive adhesives. Samples 3 through 6, those that were thermally polymerized, exhibited no signs of cure advancement and remained tacky and continued to function as pressure sensitive adhesives.

Example 7: Room Temperature Latency After Photoactivation

A mixture of 30 parts phenoxyethyl acrylate, 30 parts isobornyl acrylate, 40 parts ERL-4206 epoxy monomer and 0.02 parts KB-1 photoinitiator was prepared and purged with nitrogen and irradiated with 350BL fluorescent bulbs with stirring until the viscosity of the mixture was suitable for coating (about 700 kPa).

A mixture of 100 parts of the above syrup, 0.4 parts ground CpFeXyl $SbF_6$, 0.8 parts methyl ethyl ketone, 0.4 parts hexanediol diacrylate, 0.1 parts V-601 initiator, and 0.15 parts Perkadox 16 initiator was degassed and knife-coated at 0.125 mm thickness between two 0.100 mm silicone-coated PET films under subdued lighting. The sandwich construction was placed in 85° C. water for 15 minutes followed by 98° C. water for 10 minutes, then cooled to room temperature. The film was a transparent, tacky, self supporting pressure sensitive adhesive. DSC analysis of the film after 5 minutes of irradiation with Super Actinic™ bulbs showed a peak exotherm at 72.2° C. and a cure exotherm of 297.1 J/g. The rate of cure of this film at an isothermal temperature of 60° C. was determined by irradiating the film for 2 minutes with Super Actinic™ bulbs with the top liner removed, after which the liner was replaced and the sample immersed in a silicone oil bath heated to 60° C. for a predetermined length of time (see Table 5). DSC analysis was performed on the sample after removing it from the silicone oil to determine the extent of cure.

TABLE 5

| Minutes at 60° C. | Cure Energy (J/g) | Residual Cure (%) |
| --- | --- | --- |
| 0 | 297.1 | 100.0 |
| 2 | 91.6 | 30.8 |
| 5 | 28.7 | 9.7 |
| 10 | 16.5 | 5.6 |
| 40 | 0.0 | 0.0 |

The rate of cure of this film at room temperature was determined by irradiating the film for 2 minutes with Super Actinic™ bulbs with the top liner removed, after which the liner was replaced and the sample stored in the dark at room temperature (~22° C.). DSC analysis was performed on the sample after various lengths of time to determine the extent of cure.

TABLE 6

| Minutes at Room Temperature (22° C.) | Cure Energy (J/g) | Residual Cure (%) |
| --- | --- | --- |
| 0 | 297.1 | 100.0 |
| 30 | 237.8 | 80.0 |
| 60 | 111.9 | 37.7 |
| 180 | 80.9 | 27.2 |
| 540 | 50.1 | 16.9 |
| 4680 | 36.9 | 12.4 |

These results show that latency of cure at room temperatures can be achieved after an irradiation step in these materials to allow for positioning and repositioning.

Examples 8–9: Comparison of Cationic Organometallic and Onium Photo Initiators after Thermal Polymerization A mixture of 45 parts phenoxyethyl acrylate, 15 parts isobornyl acrylate, 30 parts EPON 828, 10 parts EPON 1001F and 0.04 parts KB-1 photoinitiator was prepared and purged with nitrogen and irradiated with 350BL fluorescent bulbs with stirring until the viscosity of the mixture was suitable for coating (about 700 kPa).

A mixture of 100 parts of the above syrup, 3.8 parts 1:1 mixture of 1,4-cyclohexane dimethanol:1,6 hexane diol, 0.3 parts V-601 initiator, 0.1 parts PERKADOX 16 initiator, and the cationic photocatalyst listed in Table 7 was degassed and knife-coated at 0.200 mm thickness between a 0.036 mm poly(ethylene terephthalate) film and 0.100 mm silicone-coated poly(ethylene terephthalate) film under subdued lighting. The sandwich construction was placed in 85° C. water for 15 minutes followed by 98° C. water for 10 minutes, then cooled to room temperature.

These tapes were tested for 180° peel adhesion to glass and aluminum substrates with and without curing. Curing of the Example 8 material was carried out by exposing the panels to irradiation under Super Actinic™ bulbs for 5 minutes and then heating in an oven at 100° C. for 10 minutes. Curing of the Example 9 material was carried out by exposing the panels to irradiation under 350BL bulbs for 5 minutes with no heating step. The resulting peel values are summarized in Table 7.

TABLE 7

| Example | Catalyst | | Average Peel Adhesion (N/cm width) | |
|---------|----------|--|------|----------|
| | | | Glass | Aluminum |
| 8 | 0.4 parts CpFeXylSbF$_6$ | Before cure After cure | 0.06 86.4 | 4.4 6.6 |
| 9 | 3.0 parts UVI-6974 | Before cure After cure | 0.09 2.1 | 3.0 6.6 |

These results showed both the cationic organometallic and onium photo-activatable catalysts can be used to prepare curable PSAs using thermal polymerization of the acrylate component. Both of these curable PSAs demonstrated an increase in bond strength after cure of the epoxy.

Examples 10–11: Comparison of COM and Onium in Melt Blended Curable PSAs

Mixture 1: A mixture of 45 parts phenoxyethyl acrylate, 15 parts isobornyl acrylate, 30 parts EPON 828, 10 parts EPON 1001F and 0.04 parts KB-1 photoinitiator was prepared and purged with nitrogen and irradiated with 350BL fluorescent bulbs with stirring until the viscosity of the mixture was suitable for coating (about 700 kPa).

Mixture 2: A mixture of 100 parts of the above syrup, 3.8 parts 1:1 mixture of 1,4-cyclohexane dimethanol:1,6 hexane diol, 0.2 parts KB-1 photoinitiator was degassed and coated at 0.75 mm thickness between two 0.100 mm silicone-coated poly(ethylene terephthalate) films. This dual-liner construction was irradiated for 15 minutes using 350BL fluorescent bulbs at a light dosage of 2260 mJ/cm$^2$. The polymerized mixture was used in Examples 10 and 11. The liners, used to polymerize the mixture were removed prior to further processing with the photo-activatable catalyst of the pressure sensitive adhesive.

In Example 10, a molten mixture of the polyacrylate-epoxy material with cationic photocatalyst was prepared by combining 100 parts of the polymerized Mixture 2 (the liners having been previously removed before combination) with 3.0 parts UVI-6974 cationic photo-initiator with stirring in an aluminum container heated to 150° C.

Pressure sensitive adhesive tapes were prepared by pressing this polymeric material to a thickness of 0.250 mm between a 0.036 mm poly(ethylene terephthalate) film and 0.100 mm silicone-coated poly(ethylene terephthalate) film using a heated platen press at a temperature of 120° C. After cooling to room temperature these tapes were tested for 180° peel adhesion to glass substrate before and after curing the epoxy component of the pressure sensitive adhesive. Curing was carried out by exposing the previously prepared panels to irradiation under 350BL bulbs for 5 minutes without a heating step. The resulting peel values are summarized in Table 8 below.

In Example 11, a molten mixture of the polyacrylate-epoxy material with cationic photocatalyst was prepared by combining 100 parts of the polymerized Mixture 2 with 1.0 parts CpFeXylSbF$_6$ cationic photo-initiator, predissolved at 25 wt-% in propylene carbonate, with stirring in an aluminum container heated to 150° C.

Pressure sensitive adhesive tapes were prepared by pressing this polymeric material to a thickness of 0.250 mm between a 0.036 mm poly(ethylene terephthalate) film and 0.100 mm silicone-coated poly(ethylene terephthalate) film using a heated platen press at a temperature of 120° C. After cooling to room temperature these tapes were tested for 180° peel adhesion to glass substrate before and after curing the epoxy component of the pressure sensitive adhesive. Curing was carried out by exposing the panels to irradiation under Super Actinic bulbs for 5 minutes followed by heating in a 100° C. oven for 10 minutes. The resulting peel values are summarized in Table 8 below.

TABLE 8

| Example | | Average Peel Adhesion to Glass (N/cm width) |
|---------|--|------|
| 10 | Before cure After cure | 0.4 10.5 |
| 11 | Before cure After cure | 0.2 10.9 |

These results how that both the cationic organometallic and onium photo-activatable catalysts could be used to prepare curable PSAs using melt-blending techniques. Both of these curable PSAs demonstrated an increase in bond strength after cure of the epoxy.

Various modifications and alterations of this invention will become apparent to those skilled in the art without departing from the scope and principles of this invention, and it should be understood that this invention is not be unduly limited to the illustrative embodiments set forth hereinabove. All publications and patents are incorporated herein by reference to the same extent as if each individual publication or patent was specifically and individually indicated to be incorporated by reference.

We claim:

1. A post curable pressure sensitive adhesive consisting essentially of:

(1) at least one free radically polymerized polymer;

(2) at least one cationically-polymerizable monomer;

(3) a photo-activatable catalyst system for the cationically-polymerizable monomer comprising either at least one organometallic complex salt or at least one onium salt; and (4) optionally, a monohydric or polyhydric alcohol, wherein there is essentially no conversion of the cationically-polymerizable monomer component of the curable pressure sensitive adhesive for at least 10 days at 20° C., 50% relative humidity, when the curable pressure sensitive adhesive is stored in a manner to exclude actinic radiation.

2. A method of preparing a post curable pressure sensitive adhesive (PSA) comprising the steps of:

( 1) preparing a polymerizable composition consisting essentially of (a) at least one free-radically polymerizable monomer, (b) at least one thermal free-radical initiator, (c) at least one cationically-polymerizable monomer, (d) a photoactivatable catalyst system for the cationically-polymerizable monomer comprising at least one organometallic complex salt or at least one onium salt, and (e) optionally, a monohydric or polyhydric alcohol; and (2) applying sufficient thermal energy to the mixture to effect essentially complete polymerization of the free-radically polymerizable monomer; and wherein there is essentially no conversion of the cationically-polymerizable monomer component of the curable pressure sensitive adhesive for at least 10 days at 20° C., 50% relative humidity, when the curable pressure sensitive adhesive is stored in a manner to exclude actinic radiation.

3. The method according to claim 2, further comprising the steps of:

(a) applying sufficient irradiation to the curable PSA to activate the photoactivatable catalyst system, and (b) providing sufficient time and/or thermal energy to effect essentially complete polymerization of the cationically polymerizable monomer.

4. A method for preparing a curable pressure sensitive adhesive (PSA) comprising the steps:

(1) preparing a first polymerizable composition consisting essentially of a mixture of (a) at least one free-radically polymerizable monomer,
(b) at least one free-radical initiator,
(c) at least one cationically-polymerizable monomer, and
(d) optionally, a monohydric or polyhydric alcohol;

(2) applying sufficient energy to the mixture to effect essentially complete polymerization of the free-radically polymerizable monomer;

(3) mixing into the polymerized composition, (a) a photoinitiated catalyst system for the cationically-polymerizable monomer comprising at least one organometallic complex salt or at least one onium salt, and (b) optionally, a monohydric or polyhydric alcohol; and wherein there is essentially no conversion of the cationically-polymerizable monomer component of the curable pressure sensitive adhesive for at least 10 days at 20° C., 50% relative humidity, when the curable pressure sensitive adhesive is stored in a manner to exclude actinic radiation.

5. The method according to claim 4, further comprising the steps of:

(a) applying sufficient irradiation to the curable PSA to activate the photoactivatable catalyst system, and (b) providing sufficient time and/or thermal energy to effect essentially complete polymerization of the cationically polymerizable monomer.

6. A method for preparing a curable pressure sensitive adhesive (PSA) comprising the steps:

(1) preparing a first polymerizable composition consisting essentially of a mixture of (a) at least one free-radically polymerizable monomer, and
(b) at least one free-radical initiator; and (2) applying sufficient energy to the mixture to effect essentially complete polymerization of the free-radically polymerizable monomer;

(3) mixing into the polymerized composition, a second polymerizable composition comprising a mixture of:

(a) at least one cationically-polymerizable monomer,
(b) a photoinitiated catalyst system for the cationically-polymerizable monomer comprising at least one organometallic complex salt or at least one onium salt, and
(c) optionally, a monohydric or polyhydric alcohol; and wherein there is essentially no conversion of the cationically-polymerizable monomer component of the curable pressure sensitive adhesive for at least 10 days at 20° C., 50% relative humidity, when the curable pressure sensitive adhesive is stored in a manner to exclude actinic radiation.

7. The method according to claim 6, further comprising the steps of:

(a) applying sufficient irradiation to the curable PSA to activate the photoactivatable catalyst system, and (b) providing sufficient time and/or thermal energy to effect essentially complete polymerization of the cationically polymerizable monomer.

8. A pressure sensitive adhesive prepared according to the methods of claims 2, 4 or 6.

9. The pressure sensitive adhesive according to claim 8, further including electrically or thermally conductive particles.

* * * * *